US009580069B2

(12) United States Patent
Nakanishi et al.

(10) Patent No.: US 9,580,069 B2
(45) Date of Patent: Feb. 28, 2017

(54) ENGINE START CONTROLLER FOR HYBRID VEHICLE

(71) Applicant: HONDA MOTOR CO., LTD., Tokyo (JP)

(72) Inventors: Koji Nakanishi, Wako (JP); Masato Shigenaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/751,698

(22) Filed: Jun. 26, 2015

(65) Prior Publication Data
US 2016/0001771 A1 Jan. 7, 2016

(30) Foreign Application Priority Data

Jul. 1, 2014 (JP) .................................. 2014-135587

(51) Int. Cl.
*B60L 9/00* (2006.01)
*B60W 20/00* (2016.01)
(Continued)

(52) U.S. Cl.
CPC ............ *B60W 20/40* (2013.01); *B60W 10/02* (2013.01); *B60W 10/06* (2013.01); *B60W 10/08* (2013.01); *B60W 30/1884* (2013.01); *B60W 30/18136* (2013.01); *B60W 50/082* (2013.01); *B60W 2510/0638* (2013.01); (Continued)

(58) Field of Classification Search
CPC ...... B60W 10/06; B60W 10/08; B60W 10/02; B60W 20/00; B60K 6/48
USPC ................ 701/22; 180/65.265, 65.6, 65.285; 903/930; 477/5
See application file for complete search history.

(56) References Cited

U.S. PATENT DOCUMENTS

| 8,827,866 B2 | 9/2014 | Nakanishi et al. |
| 2012/0116629 A1 | 5/2012 | Kamoshida |
| 2014/0136039 A1* | 5/2014 | Tanishima ............... B60K 6/48 701/22 |

FOREIGN PATENT DOCUMENTS

| JP | 2010-149714 A | 7/2010 |
| JP | 2011-016390 A | 1/2011 |

(Continued)

OTHER PUBLICATIONS

Japanese Office Action dated Nov. 30, 2016, issued in corresponding JP Application No. 2014-135587.

*Primary Examiner* — Gertrude Arthur Jeanglaud
(74) *Attorney, Agent, or Firm* — Squire Patton Boggs (US) LLP

(57) ABSTRACT

When driver's deceleration intention is detected during traveling by a motor generator with an engine being stopped, a clutch is engaged to start the engine, and thereafter disengaged. When an engine speed after engine start is lower than a reference rotational speed being an input shaft rotational speed produced by driving force reversely transmitted from drive wheels, the engine speed is increased to a target rotational speed lower than the reference rotational speed. When the engine speed reaches the target rotational speed, output from the engine is decreased and the clutch is reengaged. Thus, while engine stall when activating the engine brake, which is due to the engine speed too low after engine start, is avoided by increase in the engine speed, the clutch is reengaged earlier so as to activate the engine brake fully, generating deceleration feeling the driver expects.

4 Claims, 4 Drawing Sheets

(51) Int. Cl.
    *B60W 10/02*     (2006.01)
    *B60W 10/06*     (2006.01)
    *B60W 50/08*     (2012.01)
    *B60W 10/08*     (2006.01)
    *B60W 30/18*     (2012.01)
    *B60W 30/188*     (2012.01)

(52) U.S. Cl.
    CPC ............... *B60W 2510/109* (2013.01); *B60W 2510/1015* (2013.01); *B60W 2520/10* (2013.01); *B60W 2540/10* (2013.01); *B60W 2540/16* (2013.01); *B60W 2540/165* (2013.01); *B60W 2710/021* (2013.01); *B60W 2710/0644* (2013.01); *B60W 2710/0677* (2013.01); *Y02T 10/6221* (2013.01); *Y10S 903/93* (2013.01)

(56) References Cited

FOREIGN PATENT DOCUMENTS

| JP | 2012-218697 A | 11/2012 |
|----|---------------|---------|
| JP | 2014-058259 A | 4/2014  |
| JP | 5474980 B2    | 4/2014  |

\* cited by examiner

ENGINE START CONTROLLER FOR HYBRID VEHICLE

BACKGROUND OF THE INVENTION

Field of the Invention

The present invention relates to an engine start controller for a hybrid vehicle in which driving force of an engine is transmitted to an input shaft of a transmission via a clutch, and driving force of a motor generator is also transmitted to the input shaft.

Japanese Patent No. 5474980 has made publicly known an engine start controller for a hybrid vehicle in which an engine and a motor generator are connected to an input shaft of a twin clutch-type transmission. In the engine start controller, when the engine is started while decelerating in an EV traveling state for traveling only by driving force of the motor generator, start of the engine is achieved by cranking the engine using driving force reversely transmitted from the input shaft while changing a degree of engagement of a clutch provided between the input shaft and the engine.

Meanwhile, for example in a case where a D range (a drive range) is shifted to an L range (a first-speed fixed range) in the EV traveling state, the engine needs to be started, and sufficient deceleration needs to be generated by activating the engine brake. When the engine brake is activated by reengaging the clutch which is once disengaged after starting the engine, the engine may be stalled if an engine speed is too low. On the other hand, if the engine speed is too high, there is likelihood that: sufficient engine brake does not activate; and strange feeling is given to a driver who expects deceleration feeling. Furthermore, in a case where a gear shift stage when starting the engine is different from a gear shift stage for traveling (for example, in a case where the engine is started in a sixth speed gear shift stage and traveling is performed in a third speed gear shift stage), the clutch needs to be temporarily disengaged and thereafter to be reengaged, in order to perform a gear shift after starting the engine.

SUMMARY OF THE INVENTION

The present invention has been made with the foregoing situation taken into consideration. An object of the present invention is to activate the engine brake properly without stalling the engine when the engine is started while decelerating in the EV traveling state.

In order to achieve the object, according to a first aspect of the present invention, there is provided an engine start controller for a hybrid vehicle in which driving force of an engine is transmitted to an input shaft of a transmission via a clutch, and driving force of a motor generator is also transmitted to the input shaft, wherein: when a driver's intention for deceleration is detected during traveling by the motor generator with the engine being stopped, the engine is started by engaging the clutch, and thereafter the clutch is disengaged; and in a case where an engine speed after starting the engine is lower than a reference rotational speed which is an input shaft rotational speed produced by the driving force reversely transmitted from drive wheels, the engine speed is increased to a target rotational speed which is lower than the reference rotational speed, and when the engine speed reaches the target rotational speed, output from the engine is decreased, and the clutch is reengaged.

According to the first aspect, in the hybrid vehicle, the driving force of the engine is transmitted to the input shaft of the transmission via the clutch, and the driving force of the motor generator is also transmitted to the input shaft. When the driver's intention for deceleration is detected during traveling by the motor generator with the engine being stopped, the engine is started by engaging the clutch, and thereafter the clutch is disengaged. At this time, in the case where the engine speed after starting the engine is lower than the reference rotational speed which is the input shaft rotational speed produced by the driving force reversely transmitted from the drive wheels, the engine speed is increased to the target rotational speed which is lower than the reference rotational speed. When the engine speed reaches the target rotational speed, the output from the engine is decreased, and the clutch is reengaged. For these reasons, while stall of the engine when activating the engine brake, which is due to an engine speed too low after starting the engine, is avoided by increase in the engine speed, or while a gear shift stage when starting the engine is shifted to a gear shift stage for traveling, the clutch is reengaged earlier so as to activate the engine brake fully and generate deceleration feeling which the driver expects.

According to a second aspect of the present invention, in addition to the first aspect, a difference between the target rotational speed and the reference rotational speed is set to increase as a vehicle speed at the time of detection of the driver's intention for deceleration is larger.

According to the second aspect, the difference between the target rotational speed and the reference rotational speed is set to increase as the vehicle speed at the time of the detection of the driver's intention for deceleration is larger. For this reason, sufficient deceleration feeling can be generated by activating the engine brake earlier as the vehicle speed is larger.

According to a third aspect of the present invention, in addition to the first or second aspect, the driver's intention for deceleration is detected any one of when a traveling range is changed to a lower-speed side, when a gear shift stage is shifted to a lower-speed side, when a sport-oriented switch is turned on, and when an economic efficiency-oriented switch is turned off.

According to the third aspect, the driver's intention for deceleration is detected any one of when the traveling range is changed to the lower-speed side, when the gear shift stage is shifted to the lower-speed side, when the sport-oriented switch is turned on, and when the economic efficiency-oriented switch is turned off. This makes it possible to accurately detect the driver's intention for deceleration, and accordingly to enhance drivability of the vehicle.

Note that a first clutch C1 of an embodiment corresponds to the clutch of the present invention, and a first input shaft 11 of the embodiment corresponds to the input shaft of the present invention.

The above and other objects, characteristics and advantages of the present invention will be clear from detailed descriptions of the preferred embodiment which will be provided below while referring to the attached drawings.

DESCRIPTION OF THE PREFERRED EMBODIMENT

Descriptions will be hereinbelow provided for an embodiment of the present invention on the basis of FIGS. 1 to 4.

Figure 1:
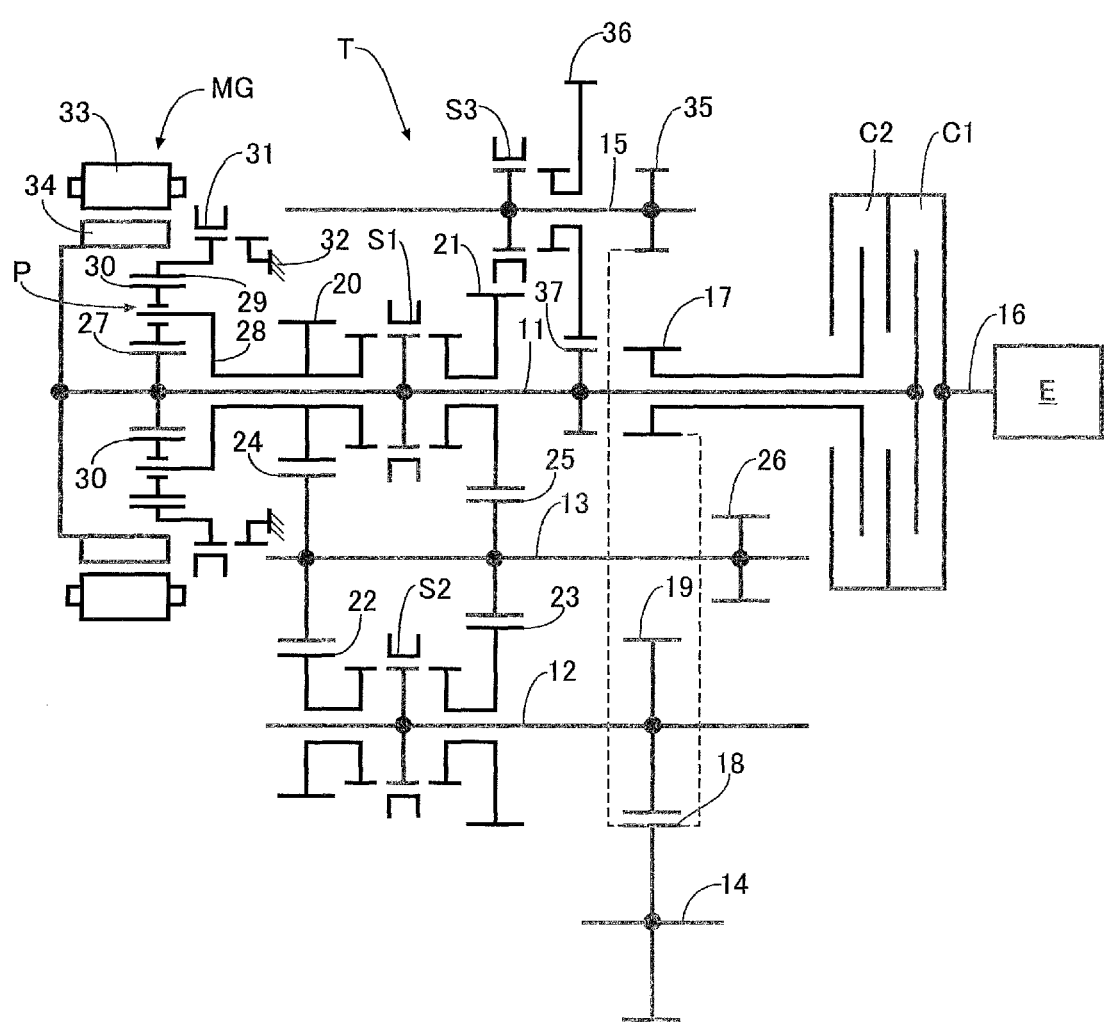
FIG. 1 is a skeleton diagram of a twin clutch-type transmission.

As shown in FIG. 1, a twin clutch-type transmission T uses an engine E and a motor generator MG as power sources, and includes a first input shaft 11, a second input shaft 12, an output shaft 13, an idler shaft 14 and a reverse shaft 15 which are disposed in parallel with one another. A first clutch C1 and a second clutch C2 each formed from a friction clutch are disposed on an axis of the first input shaft 11 in a tandem arrangement. Once the first clutch C1 is engaged, a crankshaft 16 of the engine E is connected to the first input shaft 11. Once the second clutch C2 is engaged, an idle drive gear 17 relatively rotatably supported on the first input shaft 11 is connected to the crankshaft 16. The idle drive gear 17 is meshed with a first idle follower gear 18 fixedly provided to the idler shaft 14, and the first idle follower gear 18 is meshed with a second idle follower gear 19 fixedly provided to the second input shaft 12. Thereby, engagement of the first clutch C1 transmits driving force of the engine E to the first input shaft 11, and engagement of the second clutch C2 transmits the driving force of the engine E to the second input shaft 12 via the idle drive gear 17, the first idle follower gear 18 and the second idle follower gear 19.

A third speed drive gear 20 and a fifth speed drive gear 21 are relatively rotatably supported on the first input shaft 11. The third speed drive gear 20 and the fifth speed drive gear 21 are selectively connectable to the first input shaft 11 via a third-fifth speed synchronizer S1. A second speed drive gear 22 and a fourth speed drive gear 23 are relatively rotatably supported on the second input shaft 12. The second speed drive gear 22 and the fourth speed drive gear 23 are selectively connectable to the second input shaft 12 via a second-fourth speed synchronizer S2. A second-third speed follower gear 24 and a fourth-fifth speed follower gear 25 are fixedly provided to the output shaft 13. The second-third speed follower gear 24 is meshed with the second speed drive gear 22 and the third speed drive gear 20, while the fourth-fifth speed follower gear 25 is meshed with the fourth speed drive gear 23 and the fifth speed drive gear 21. A final drive gear 26 is fixedly provided to the output shaft 13. The final drive gear 26 is connected to drive wheels via a differential gear, albeit not illustrated.

The motor generator MG and a planetary gear mechanism P are connected to a shaft end of the first input shaft 11 on a side opposite from the engine E. The planetary gear mechanism P includes: a sun gear 27 fixedly provided to the first input shaft 11; a carrier 28 relatively rotatably supported on the first input shaft 11, and connected to the third speed drive gear 20; a ring gear 29 relatively rotatably arranged on an outer periphery of the first input shaft 11; and multiple pinions 30 rotatably supported by the carrier 28, and being in mesh with the sun gear 27 and the ring gear 29. The ring gear 29 is connectable to a casing 32 via a dog clutch 31. The motor generator MG includes a stator 33 and a rotor 34. The rotor 34 is connected to the first input shaft 11.

A third idle follower gear 35 fixedly provided to the reverse shaft 15 is meshed with the first idle follower gear 18. The reverse drive gear 36 is meshed with a reverse follower gear 37 fixedly provided to the first input shaft 11, the reverse drive gear 36 being relatively rotatably supported on the reverse shaft 15 and connectable to the reverse shaft 15 via a reverse synchronizer S3.

The transmission T having the skeleton of the structure as described above is capable of establishing a first speed gear shift stage to the fifth speed gear shift stage, and the reverse gear shift stage. Descriptions will be hereinbelow provided for a torque flow for each speed gear shift stage.

[First Speed Gear Shift Stage]

When the first clutch C1 is engaged while the ring gear 29 of the planetary gear mechanism P is connected to the casing 32 via the dog clutch 31, the first speed gear shift stage is established such that the driving force of the engine E is transmitted to the final drive gear 26 via the crankshaft 16, the first clutch C1, the first input shaft 11, the sun gear 27, the carrier 28, the third speed drive gear 20, the second-third speed follower gear 24 and the output shaft 13. During this transmission process, rotation of the first input shaft 11 is transmitted to the third speed drive gear 20 while decelerated by the planetary gear mechanism P. For this reason, regardless of the use of the third speed drive gear 20, the first speed gear shift stage with a gear ratio higher than that of the third speed gear shift stage can be established.

When the motor generator MG is driven in this state, driving force of the motor generator MG is inputted into the sun gear 27 of the planetary gear mechanism P. For this reason, HEV (Hybrid Electric Vehicle) traveling to be performed with the driving force of the motor generator MG assisting the driving force of the engine E can be realized. When the motor generator MG is driven with the first clutch C1 disengaged, EV (Electric Vehicle) traveling to be performed using only the driving force of the motor generator MG can be realized.

In addition, when the first clutch C1 is engaged during the EV traveling, the engine E can be started by cranking the crankshaft 16 using the driving force which is reversely transmitted from the drive wheels or the motor generator MG.

[Second Speed Gear Shift Stage]

When the second clutch C2 is engaged while the second speed drive gear 22 is connected to the second input shaft 12 via the second-fourth speed synchronizer S2, the second speed gear shift stage is established such that the driving force of the engine E is transmitted to the final drive gear 26 via the crankshaft 16, the second clutch C2, the idle drive gear 17, the first idle follower gear 18, the second idle follower gear 19, the second input shaft 12, the second-fourth speed synchronizer S2, the second speed drive gear 22, the second-third speed follower gear 24 and the output shaft 13.

While the second speed gear shift stage is in establishment, when the motor generator MG is driven with the third speed drive gear 20 connected to the first input shaft 11 via the third-fifth speed synchronizer S1, or with the ring gear 29 of the planetary gear mechanism P connected to the casing 32 via the dog clutch 31, the driving force of the motor generator MG is transmitted to the output shaft 13 via the third speed drive gear 20 and the second-third speed follower gear 24. Thus, the HEV traveling to be performed with the driving force of the motor generator MG assisting the driving force of the engine E can be realized.

[Third Speed Gear Shift Stage]

When the first clutch C1 is engaged while the third speed drive gear 20 is connected to the first input shaft 11 via the third-fifth speed synchronizer S1, the third speed gear shift stage is established such that the driving force of the engine E is transmitted to the final drive gear 26 via the crankshaft 16, the first clutch C1, the first input shaft 11, the third-fifth speed synchronizer S1, the third speed drive gear 20, the second-third speed follower gear 24 and the output shaft 13.

When the motor generator MG is driven while the third speed gear shift stage is in establishment, the driving force of the motor generator MG is transmitted to the first input shaft 11. Thus, the HEV traveling to be performed with the driving force of the motor generator MG assisting the driving force of the engine E can be realized. When the motor generator MG is driven with the first clutch C1 disengaged, the EV traveling to be performed using only the driving force of the motor generator MG can be realized.

Furthermore, when the first clutch C1 is engaged during the EV traveling, the engine E can be started by cranking the crankshaft 16 using the driving force which is reversely transmitted from the drive wheels or the motor generator MG.

[Fourth Speed Gear Shift Stage]

When the second clutch C2 is engaged while the fourth speed drive gear 23 is connected to the second input shaft 12 via the second-fourth speed synchronizer S2, the fourth speed gear shift stage is established such that the driving force of the engine E is transmitted to the final drive gear 26 via the crankshaft 16, the second clutch C2, the idle drive gear 17, the first idle follower gear 18, the second idle follower gear 19, the second input shaft 12, the second-fourth speed synchronizer S2, the fourth speed drive gear 23, the fourth-fifth speed follower gear 25 and the output shaft 13.

While the fourth speed gear shift stage is in establishment, when the motor generator MG is driven with the third speed drive gear 20 connected to the first input shaft 11 via the third-fifth speed synchronizer S1, or with the ring gear 29 of the planetary gear mechanism P connected to the casing 32 via the dog clutch 31, the driving force of the motor generator MG is transmitted to the output shaft 13 via the third speed drive gear 20 and the second-third speed follower gear 24. Thus, the HEV traveling to be performed with the driving force of the motor generator MG assisting the driving force of the engine E can be realized.

[Fifth Speed Gear Shift Stage]

When the first clutch C1 is engaged while the fifth speed drive gear 21 is connected to the first input shaft 11 via the third-fifth speed synchronizer S1, the fifth speed gear shift stage is established such that the driving force of the engine E is transmitted to the final drive gear 26 via the crankshaft 16, the first clutch C1, the first input shaft 11, the third-fifth speed synchronizer S1, the fifth speed drive gear 21, the fourth-fifth speed follower gear 25 and the output shaft 13.

When the motor generator MG is driven while the fifth speed gear shift stage is in establishment, the driving force of the motor generator MG is transmitted to the first input shaft 11. Thus, the HEV traveling to be performed with the driving force of the motor generator MG assisting the driving force of the engine E can be realized. When the motor generator MG is driven with the first clutch C1 disengaged, the EV traveling to be performed using only the driving force of the motor generator MG can be realized.

Moreover, when the first clutch C1 is engaged during the EV traveling, the engine E can be started by cranking the crankshaft 16 using the driving force which is reversely transmitted from the drive wheels or the motor generator MG.

[Reverse Gear Shift Stage]

When the second clutch C2 is engaged while the reverse drive gear 36 is connected to the reverse shaft 15 via the reverse synchronizer S3, and while the ring gear 29 of the planetary gear mechanism P is connected to the casing 32 via the dog clutch 31, the reverse gear shift stage is established such that: the driving force of the engine E is transmitted to the first input shaft 11 with rotation of the driving force of the engine E reversed, via the crankshaft 16, the second clutch C2, the idle drive gear 17, the first idle follower gear 18, the third idle follower gear 35, the reverse shaft 15, the reverse synchronizer S3, the reverse drive gear 36 and the reverse follower gear 37; and then the driving force of the engine E is transmitted from the first input shaft 11 to the final drive gear 26 via the sun gear 27, the carrier 28, the third speed drive gear 20, the second-third speed follower gear 24 and the output shaft 13.

Meanwhile, during the EV traveling of the vehicle, when the driver performs switching from a D range (drive range) to an L range (first-speed fixed range) while decelerating the vehicle by releasing an acceleration pedal, the engine E needs to be started in order to obtain larger acceleration force from the engine traveling, and concurrently, it is necessary to make the driver realize that it has become possible to perform larger acceleration using the L range by generating deceleration, which is similar to that when downshifting, by using engine brake.

When the first clutch C1 is engaged during deceleration of the vehicle in the EV traveling with the transmission T of the embodiment establishing the first speed gear shift stage, the third speed gear shift stage or the fifth speed gear shift stage, the driving force from the output shaft 13 is reversely transmitted to the engine E via the engaged first clutch C1, and the engine E can be started by being cranked using the reversely-transmitted driving force. In this event, if torque corresponding to the cranking torque is transmitted to the engine E by temporarily driving the motor generator MG, the engine E can be smoothly started without causing shocks.

As described above, when the first clutch C1, once disengaged, is reengaged after starting the engine E, the driving force is reversely transmitted from the output shaft 13 to the engine E. Thereby, the engine brake is activated. At this time, in the embodiment, an engine speed is controlled so as to temporarily increase, and the first clutch C1 is reengaged at predetermined timing. This makes it possible to activate the engine brake appropriately in an early stage without stalling the engine E, and to generate deceleration feeling which the driver expects.

Figure 2:
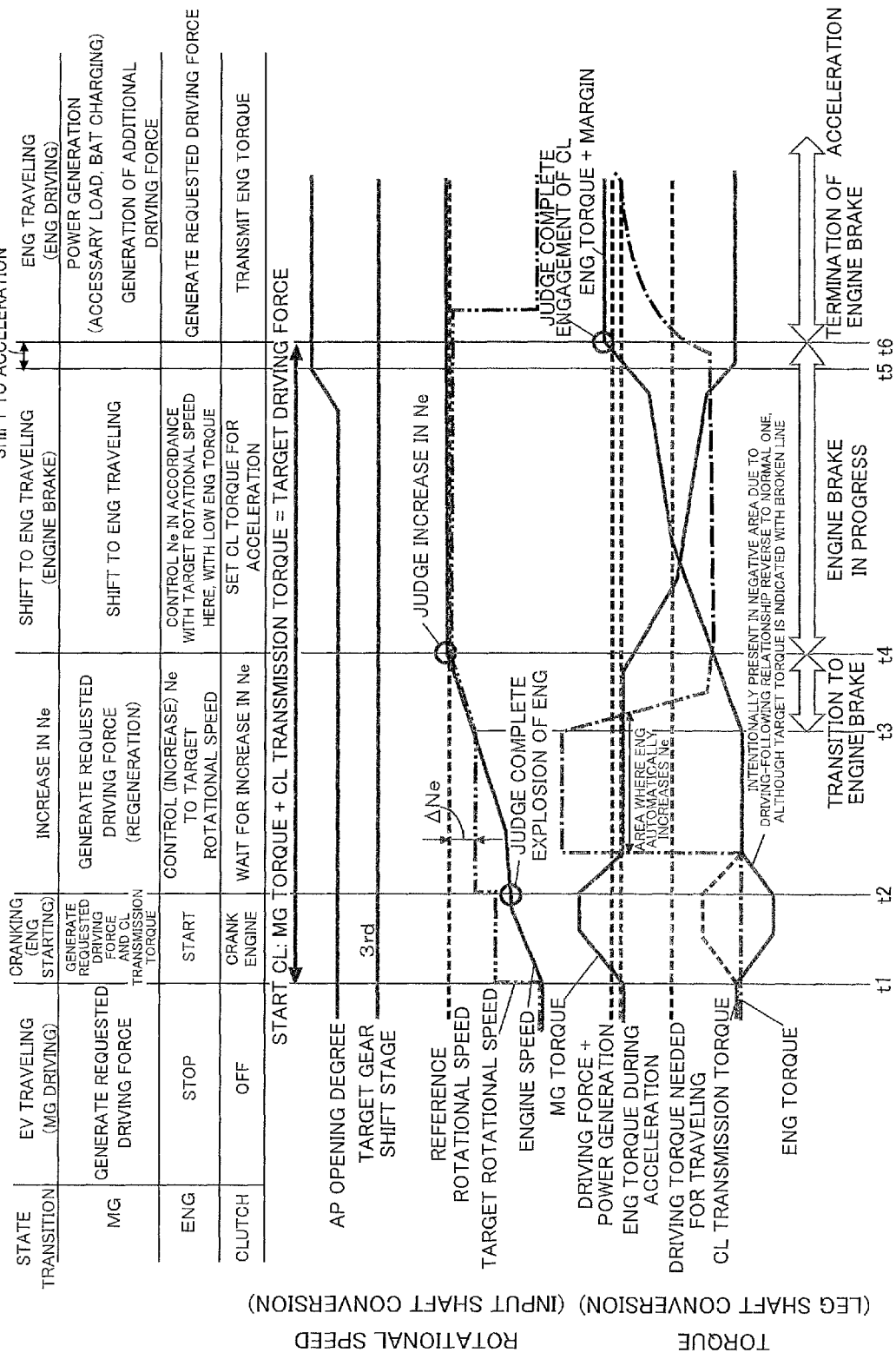
FIG. 2 is a time chart for explaining how to start an engine during deceleration.

Descriptions will be hereinbelow provided for an example of such control on the basis of a time chart in FIG. 2.

When the acceleration pedal is returned during the EV traveling with the transmission T establishing the third speed gear shift stage which is an odd gear shift stage, regenerative brake is applied to the motor generator MG by the driving force reversely transmitted from the output shaft 13. At time t1, when the shift range is switched from the D range to the L range so that the driver's intention for deceleration is detected, the first clutch C1 is temporarily engaged, and the driving force of the motor generator MG is temporarily increased (the regenerative braking force is decreased). Thereby, the engine E is started by being cranked by torque (clutch transmission torque) reversely transmitted from the drive wheels and the motor generator MG via the thus-engaged first clutch C1.

At time t2, when the start of the engine E is completed by complete explosion of the engine E, the engine E is disconnected from the first input shaft 11 by temporarily disengaging the first clutch C1. In this event, if the engine speed is lower than a reference rotational speed being a rotational speed of the first input shaft 11 which is rotated by the driving force reversely transmitted from the output shaft 13, the engine speed is increased to a target rotational speed. The target rotational speed is set smaller than the reference rotational speed by a predetermined offset value ΔNe.

At time t3, when the engine speed reaches the target rotational speed as a result of increase in the engine speed, output torque from the engine E is decreased, and engagement of the first clutch C1 is started while slipping the first clutch C1. Thereafter, as engagement force of the first clutch C1 gradually increases, clutch torque transmitted to the engine E increases. Thereby, braking force of the engine brake begins to increase.

After the engine speed becomes equal to the reference rotational speed at time t4, the engine brake is activated by: controlling the engine speed in order for the engine speed to be kept equal to the reference rotational speed; and reducing engine torque to a small level. During the activation of the engine brake, braking operation is shifted from the regenerative brake to the engine brake while gradually increasing the braking force of the engine brake by gradually increasing engagement force of the first clutch C1, and while gradually decreasing the regenerative braking force of the motor generator MG.

At time t5, when the driver depresses the acceleration pedal, the engine torque increases. At time t6, the first clutch C1 is completely engaged, and the EV traveling condition is shifted to the engine traveling condition.

As described above, according to the embodiment, when the driver's intention for deceleration is detected during the EV traveling using the driving force of the motor generator MG with the engine E being stopped, the engine E is started by temporarily engaging the first clutch C1, and the first clutch C1 is thereafter disengaged. In this event, if the engine speed after starting the engine E is lower than the reference rotational speed being the rotational speed of the first input shaft 11 which is rotated by the driving force reversely transmitted from the output shaft 13, the engine speed is increased to the target rotational speed which is lower than the reference rotational speed. When the engine speed reaches the target rotational speed, the output from the engine E is decreased, and the first clutch C1 is reengaged. For these reasons, timing of the engagement of the first clutch C1 can be made earlier than that in a case where the first clutch C1 is reengaged after the engine speed reaches the reference rotational speed. Thus, while stall of the engine E when activating the engine brake, which is due to an engine speed too low after starting the engine E, is avoided by increase in the engine speed, earlier engagement of the first clutch C1 can activate the engine brake fully and generate the deceleration feeling which the driver expects.

Figure 3:
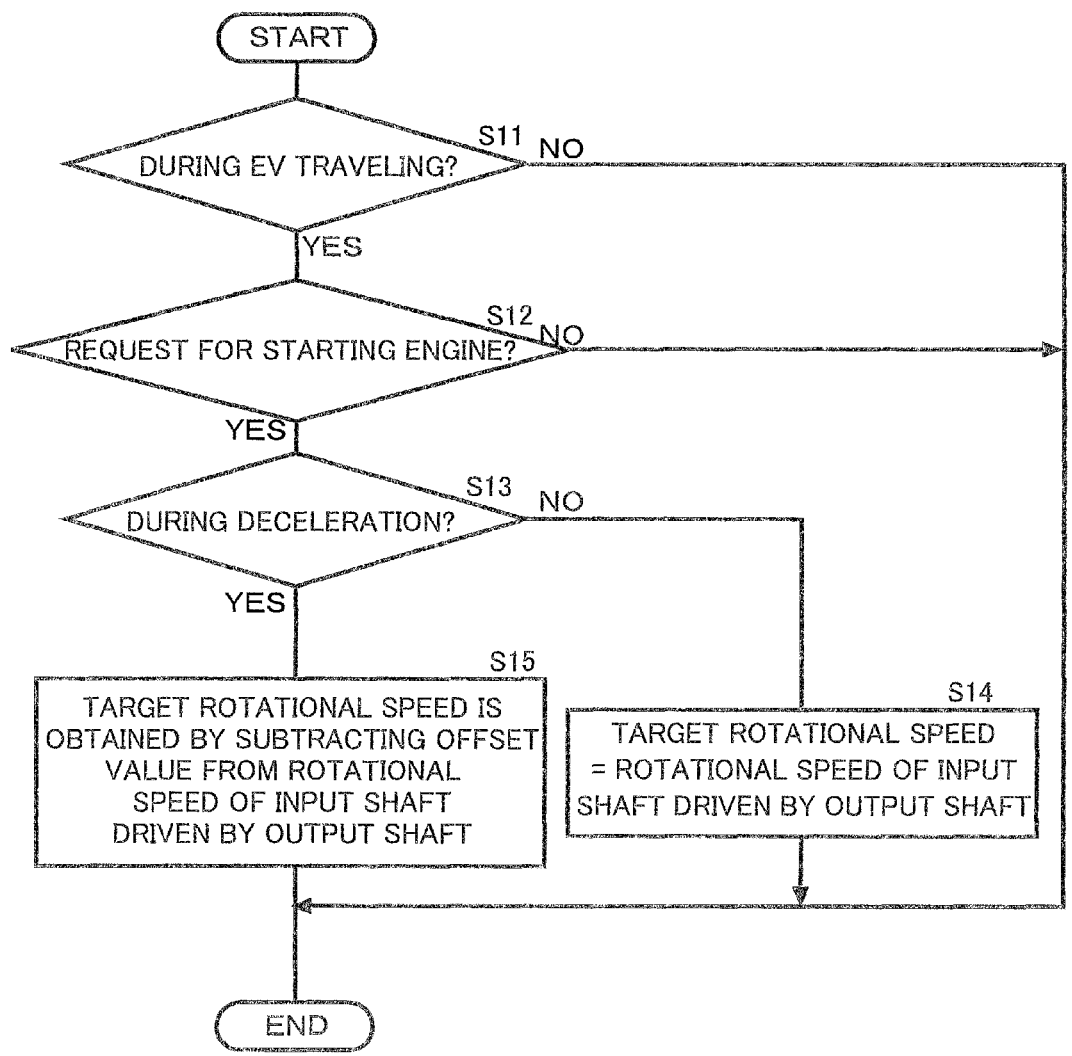
FIG. 3 is a flow chart showing a procedure for setting a target rotational speed after starting the engine.

A flowchart in FIG. 3 shows a procedure for setting the target rotational speed. If the vehicle is in the process of the EV traveling in step S11, if there is a request for starting the engine E in step S12, and if the vehicle is not in the process of deceleration in step S13, the target rotational speed is defined in step S14 as the rotational speed of the first input shaft 11 driven by the output shaft 13 (the reference rotational speed). On the other hand, if the vehicle is in the process of deceleration in step S13, the target rotational speed is defined in step S15 as a value obtained by subtracting the offset value ΔNe from the rotational speed of the first input shaft 11 driven by the output shaft 13 (the reference rotational speed).

Figure 4:
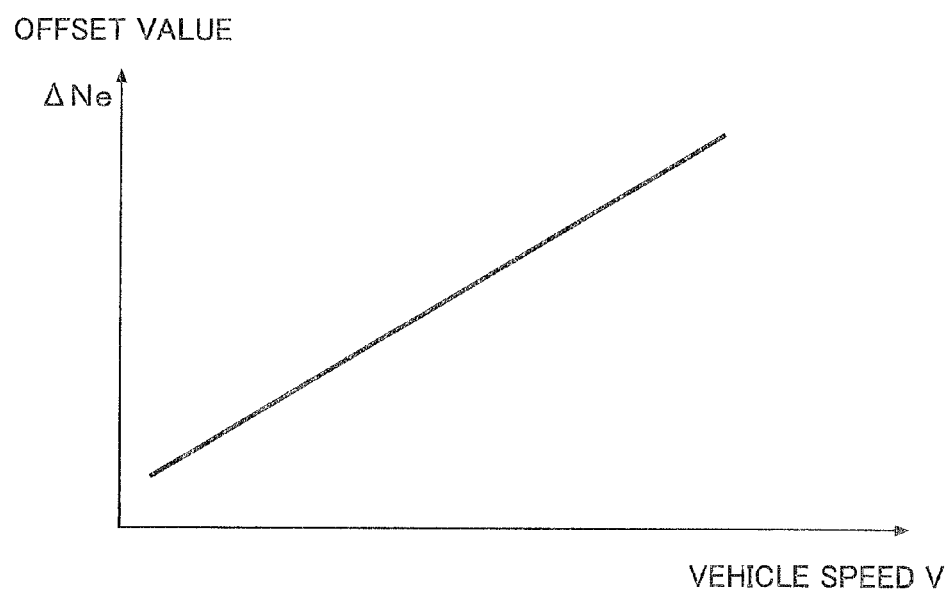
FIG. 4 is a diagram showing a map for searching for the target rotational speed depending on a vehicle speed.

As shown in FIG. 4, a map is searched for the offset value ΔNe which is the difference between the target rotational speed and the reference rotational speed, using a vehicle speed V at the time of confirming the driver's intension for deceleration as a parameter. The offset value ΔNe is set to increase as the vehicle speed V increases. For this reason, if strong engine brake is needed for deceleration from a high vehicle speed, the target rotational speed becomes smaller in exchange of increase in the offset value ΔNe. Thus, the engine speed exceeds the target rotational speed at an earlier stage, and the timing when the first clutch C1 is engaged is quickened. Hence, sufficient deceleration can be obtained by activating the engine brake earlier.

Although the foregoing descriptions have been provided for the embodiment of the present invention, various design changes may be made to the present invention within a scope not departing from the gist of the present invention.

For example, in the embodiment, the engine E is started and the engine brake is activated when performing switching from the D range to the L range. In addition, the same control may be performed when the gear shift stage is shifted to a lower speed side by manipulating a paddle switch or the like provided to a steering wheel, when the mode is switched to a sport mode by turning on a sport-oriented switch, and when an economy mode is cancelled by turning off an economic efficiency-oriented switch.

What is claimed is:

1. An engine start controller for a hybrid vehicle having an engine and a motor generator in which the engine and the motor generator are connected in parallel with each other to an input shaft of a transmission, driving force of the engine is transmitted to the input shaft via a clutch, and driving force of the motor generator is also transmitted to the input shaft, wherein:
   when a driver's intention for deceleration is detected during traveling by the motor generator with the engine being stopped, the engine is started by engaging the clutch, and thereafter the clutch is disengaged; and
   in a case where an engine speed after starting the engine is lower than a reference rotational speed which is an input shaft rotational speed produced by the driving force reversely transmitted from drive wheels, the engine speed is increased to a target rotational speed which is lower than the reference rotational speed, and when the engine speed reaches the target rotational speed, output from the engine is decreased, and the clutch is reengaged.

2. The engine start controller for the hybrid vehicle according to claim 1, wherein a difference between the target rotational speed and the reference rotational speed is set to increase as a vehicle speed at the time of detection of the driver's intention for deceleration is larger.

3. The engine start controller for the hybrid vehicle according to claim 1, wherein the driver's intention for deceleration is detected any one of when a traveling range is changed to a lower-speed side, when a gear shift stage is shifted to a lower-speed side, when a sport-oriented switch is turned on, and when an economic efficiency-oriented switch is turned off.

4. The engine start controller for the hybrid vehicle according to claim 2, wherein the driver's intention for deceleration is detected any one of when a traveling range is changed to a lower-speed side, when a gear shift stage is shifted to a lower-speed side, when a sport-oriented switch is turned on, and when an economic efficiency-oriented switch is turned off.

* * * * *